United States Patent [19]

Corley

[11] Patent Number: 4,565,153

[45] Date of Patent: Jan. 21, 1986

[54] APPARATUS FOR IMPREGNATION OF REINFORCING FIBERS

[75] Inventor: Larry S. Corley, Houston, Tex.

[73] Assignee: Shell Oil Company, Houston, Tex.

[21] Appl. No.: 571,259

[22] Filed: Jan. 16, 1984

[51] Int. Cl.$^4$ ............................................. B05C 3/02
[52] U.S. Cl. .................................... 118/405; 118/420;
118/DIG. 19; 264/174; 264/328.6; 427/434.7
[58] Field of Search ............... 264/136, 137, 257, 174,
264/328.6; 427/434.6, 434.7; 118/405, 420,
DIG. 19; 425/381

[56] References Cited

U.S. PATENT DOCUMENTS

| | | | |
|---|---|---|---|
| 2,963,739 | 12/1960 | Whitehurst et al. | 118/DIG. 19 |
| 3,530,212 | 9/1970 | Kienle et al. | 264/137 |
| 3,894,134 | 7/1975 | Williams | 264/174 |
| 4,343,843 | 8/1982 | Johnson et al. | 264/137 |
| 4,455,133 | 6/1984 | Jakob et al. | 425/381 |
| 4,464,320 | 8/1984 | Saidla | 264/328.6 |

FOREIGN PATENT DOCUMENTS 676935 12/1963 Canada ............................ 427/434.7

*Primary Examiner*—Donald Czaja
*Assistant Examiner*—Mary Lynn Fertig

[57] ABSTRACT

A method and apparatus for impregnating reinforcing fibers with a thermosetting resin having a short pot life. The method comprises mixing the components of the resin and supplying the mixed resin under pressure to an enclosed chamber. The reinforcing fibers are pulled through the chamber to rapidly impregnate the fibers with resin and the coated fibers are immediately utilized in forming a molded article.

9 Claims, 3 Drawing Figures

APPARATUS FOR IMPREGNATION OF REINFORCING FIBERS

BACKGROUND OF THE INVENTION

The present invention relates to fiber reinforced resin structures and particularly to a method and apparatus for coating the fiber strands with resin. Fiber reinforced resin structures can utilize various fibers, for example, glass, carbon, boron, aramid, polyester or a combination of these fibers. Likewise, various resins may be used such as epoxies or polyesters. The invention is particularly adapted for use with resins having relatively short cure times or pot life. It is conventional in the molding of composite articles from fiber reinforced resin to coat the fibers with resin using an open bath or similar structure wherein the fibers are first passed through the bath and then a means for removing the excess resin. After coating, the fibers are used to form the composite article either by molding in a die, wrapping the coated fibers on a suited mandrel, or passing them through an extrusion die which will extrude the desired article.

Normally, the coating baths are open to the atmosphere and contain a relatively large quantity of resin which has previously been mixed with a suitable curing agent. Thus, it is necessary to use mixtures of resin and curing agent which have a relatively long cure time or pot life. This, in turn, necessitates some means for accelerating the cure time after the coated fiber has been formed in the desired shape. The most commonly used means is to apply heat to the composite to accelerate the cure time.

Another method that has been used in the past comprises placing the fiber reinforcement in the mold and then injecting the resin into the mold. This allows the use of mixtures of resin and curing agent having shorter cure times. While the shorter cure time resins can be used there is no assurance that all of the fiber reinforcing material will be equally coated by the resin curing agent mixture injected into the mold. Further, the fiber reinforcing material and resin may not be uniformly distributed throughout the article.

SUMMARY OF THE INVENTION

The present invention solves the above problems of coating reinforcing fibers with a resin curing agent mixture having a relatively short pot life. The mixture is supplied under pressure to an enclosed coating chamber with the reinforcing fibers being pulled through the enclosed chamber. In particular, the invention is adapted to coating individual fiber strands or individual ropes of fibers. The resin and curing agent are contained in separate tanks and supplied under pressure to a static mixing device which discharges directly into the enclosed chamber. By maintaining the volume of the static mixer and the cavities in the enclosed chamber at a minimum the resident time of the mixed resin and curing agent is reduced to a bare minimum. The use of a minimum volume of mixed resin and curing agent reduces the possibility of resin gelling or curing in the system.

After the fibers are coated the excess coating is removed and the fibers may be used either to extrude desired articles or wound on a mandrel to produce hollow articles. The use of resin curing agent mixtures having a short cure time eliminates the need for any external means for accelerating the cure time and the formed article will cure at ambient temperature.

BRIEF DESCRIPTION OF THE DRAWINGS

The invention will be more easily understood from the following description when taken in conjunction with the attached drawing in which.

DESCRIPTION OF PREFERRED EMBODIMENTS

Figure 1:
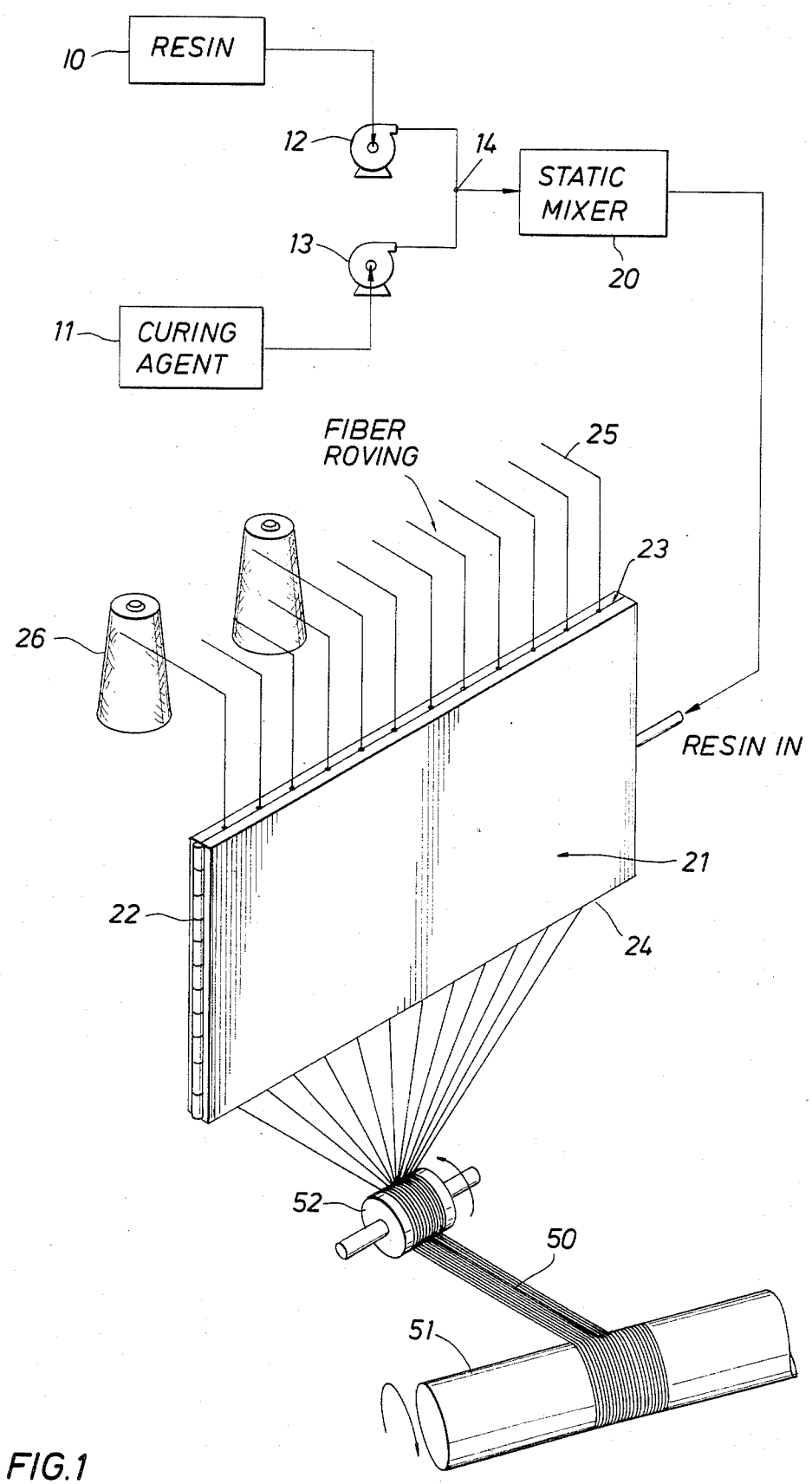
FIG. 1 is a block diagram of a system for carrying out the invention.
Figure 2:
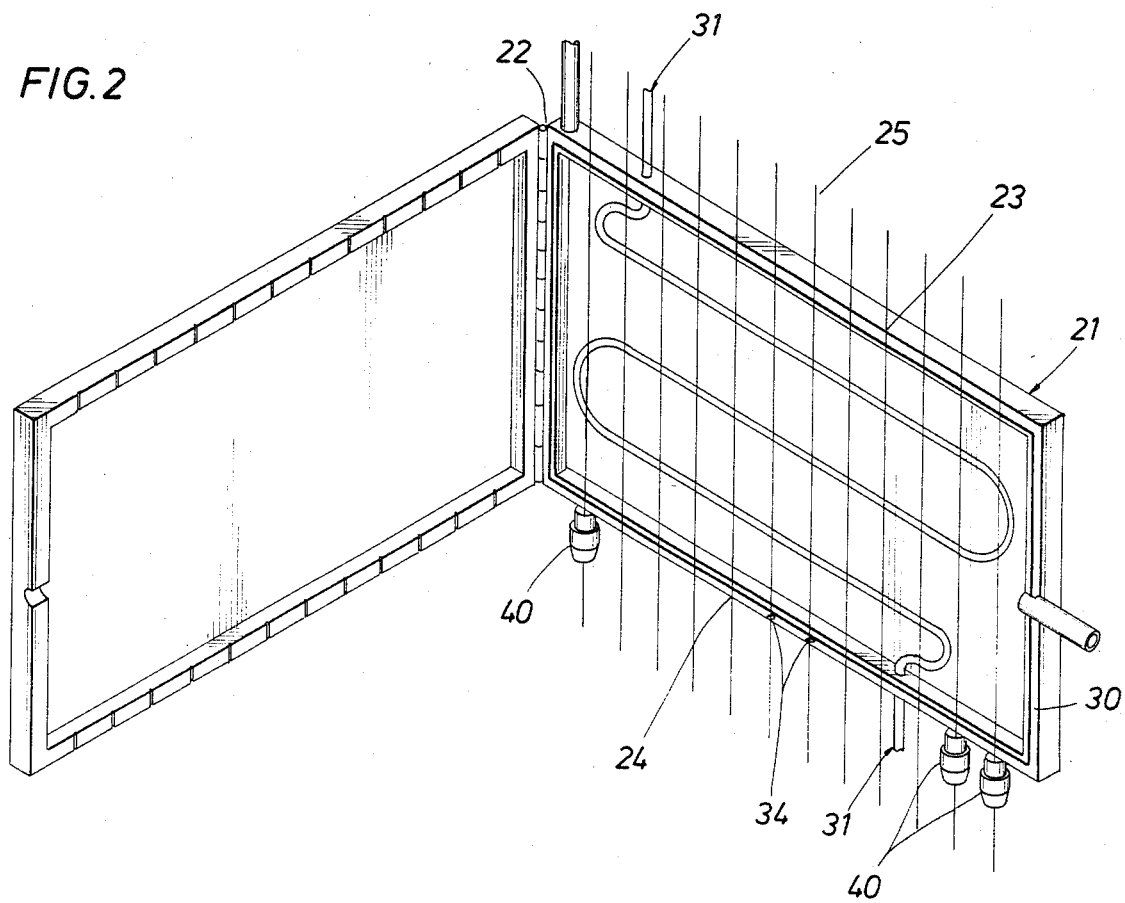
FIG. 2 is a pictorial view of one embodiment of an enclosed chamber for coating the fiber with resin.

Referring to FIGS. 1 and 2, there is shown one apparatus for carrying out the method of this invention. In particular, there is shown two tanks 10 and 11 for containing a supply or source of resin and curing agent respectively. The tanks are connected to pumps 12 and 13 which, in addition to pressurizing the resin and curing agent, also meter the two components to provide the proper resin curing agent mix. Of course, in place of metering pumps one could use pumps in combination with metering devices such as flow orifices or other types of metering devices. The resin and curing agent are joined at a common point 14 and supplied to a static mixing device 20. In place of the static mixing device 20 a power driven mixer can be used although in most instances the static mixer will be sufficient and simplify the equipment. The main requirement of the mixer is that it intimately mix the curing agent and resin to ensure that the resin will cure uniformly.

The mixer discharges directly into a closed chamber 21 that coats the fibers. The chamber 21 is formed from a pair of box-shaped members having length and width that is substantially greater than their depth. The chamber 21 is hinged at one end 22 to allow opening and cleaning when the system is shut down. The chamber 21 is provided with openings 23 and 24 in opposite ends in order that a plurality of continuous fibers, for example, glass or graphite filaments 25, may be passed from the top opening 23 through container 21 and exit from the bottom opening 24. The fibers may be either single strand fibers or roving and are stored on spools 26. The chamber is provided with a flexible seal ring 30 on its outer edge that cooperates with a surface on the outer half of the chamber to seal the chamber.

Also optionally positioned in one wall of the chamber is a heating means 31 that may comprise a heating coil supplied with a heated fluid or an electrical heating coil. The use of a means for heating the resin curing agent mix will depend upon the particular components used. Also, the ambient temperature may be low requiring the use of supplemental heat to maintain the desired cure times. The chamber should be provided with some means for removing excess resin from the fibers. The means may consist of simple seal rings in the openings 34 or adjustable orifices 40 as shown in FIG. 2. The adjustable orifice can utilize a threaded outer barrel that varies the opening in a flexible orifice. An alternate arrangement for removing excess resin would be a squeegee type device positioned in the exit opening of the chamber. A heating means can be incorporated with the orifices to heat the resin as the fiber exits from the chamber. This would eliminate the need to heat all of the resin in the chamber, as would be the case if the heating elements were incorporated in the side walls of the chamber. The cavity of the chamber should have a minimum volume to reduce the residence time of the mixture of resin and curing agent and minimize the possibility of the resin curing or gelling in the closed chamber. Also, as explained, the static mixer should be directly coupled to the closed chamber to eliminate or minimize the volume of mixture and thus the residence time. The filaments that are drawn from the bottom of the chamber can be grouped together in a side-by-side relationship to form a flat band 50 that can be wound on the mandrel 51. For example, the individual filaments may be passed over a grooved roller 52 which will serve to align the filaments in a side-by-side relationship suitable for winding on the mandrel.

Instead of wrapping the filaments on a mandrel to form a tubular member, the filaments can be formed in a rope and passed through an extrusion die to form a tubular or rod-like member in which all of the filaments are aligned along the longitudinal axis of the member. Of course, other shapes such as I-beams or channel or angles can also be formed by passing the coated filaments through an extrusion die. Also, instead of using individual filaments, strands of filaments or rope-like structures can be coated and used to form extruded structures.

Figure 3:
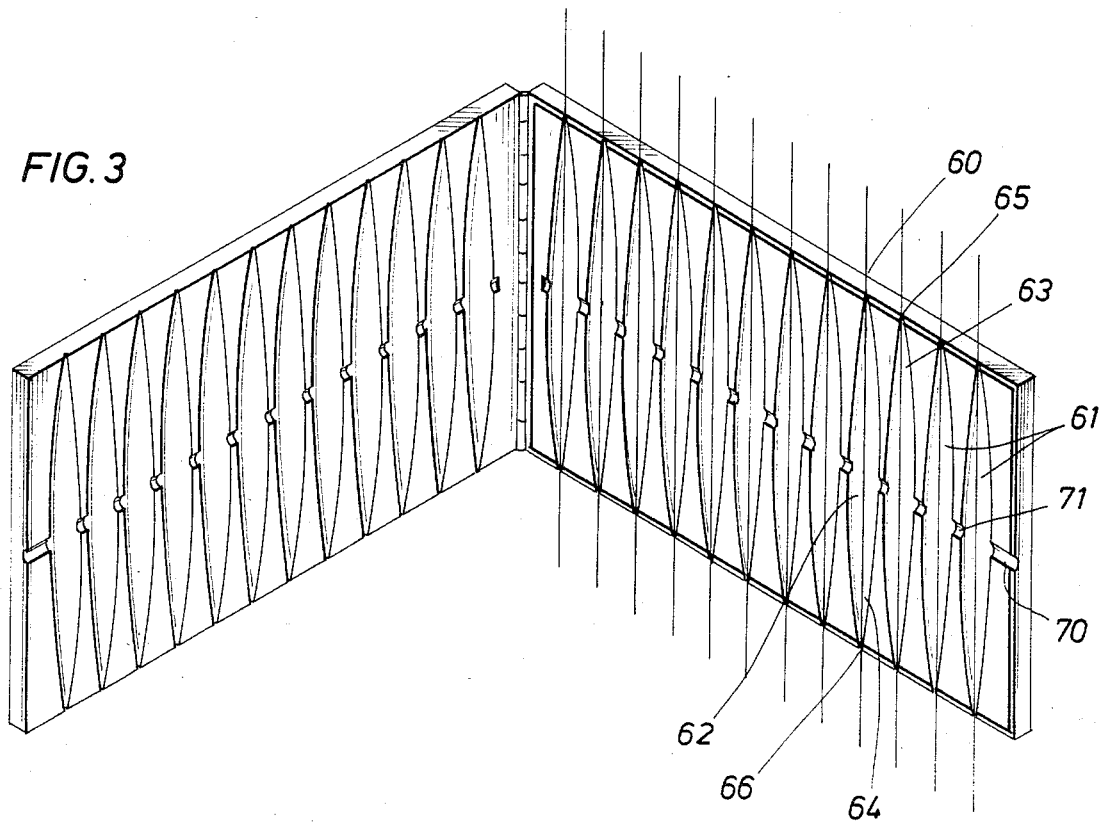
FIG. 3 is a second embodiment of the enclosed chamber for coating the fiber with resin.

FIG. 3 shows a modified coating chamber 60 having individual elliptical shaped resin cavities 61 in place of the single cavity shown in FIG. 2. The cavities have an enlarged center section 62 and small end openings 63 and 64 that connect with the inlet 65 and outlet 66 openings of the chamber. A resin inlet 70 is connected to each of the cavities by a series of passages 71 formed in the walls of the chamber. The chamber should be provided with means for removing the excess resin from the fibers, such as those shown in FIG. 2. Also, heating means may be incorporated in the chamber to control the setting of the resin.

When the volume of mixed resin and curing agent is maintained at a minimum, the time that elapses between mixing of resin and curing agent and the forming of a molded part is reduced to a minimum. The use of a closed chamber to contain the mixed resin and curing agent under pressure ensures that the fibers are coated using a minimum volume of mixed resin and curing agent. The small volume allows the use of short pot life resin mixtures and coating of fibers before forming the molded article which ensures that each fiber is properly coated.

What is claimed is:

1. An apparatus for impregnating reinforcing fibers with mixed resin and curing agent comprising:
   a first source of resin and a second source of curing agent;
   means coupled to said sources for supplying desired amounts of said resin and curing agent under pressure to a common point;
   a mixing device having an inlet and discharge, the inlet of said mixing device being connected directly to said common point;
   an enclosed chamber, said chamber being formed from a pair of box-shaped members joined at their edges to form said chamber, said box-shaped members having a length and width that is substantially greater than their depth, said chamber having inlets and outlets formed on opposite sides of said chamber for the reinforcing fibers, a resin inlet formed in another side of said chamber, the discharge of said mixing device being directly coupled to said resin inlet in said chamber whereby said reinforcing fibers may be passed through said chamber and coated with resin; and
   an adjustable orifice disposed on the outlet of said chamber to remove excess resin from said reinforcing fibers.

2. The apparatus of claim 1 wherein said mixing device is a static mixer.

3. The apparatus of claim 2 wherein said mixed resin and curing agent are supplied to said chamber at a pressure of between 10 and 100 psi.

4. The apparatus of claim 1, wherein a heating means is disposed in said chamber to control the temperature of said resin.

5. The apparatus of claim 1, wherein each of said box-shaped members include a plurality of individual cavities, each cavity being provided with a separate inlet and outlet.

6. The apparatus of claim 5 wherein each cavity has an oval shape.

7. The apparatus of claim 6 wherein a passageway is formed in said chamber, said passageway communicating with each of said cavities and said resin inlet.

8. The apparatus of claim 1, wherein said box-shaped members are hinged at one side.

9. The apparatus of claim 8 wherein one of said box-shaped members is provided with a sealing means that cooperates with a mating surface on the other box-shaped member to effectively seal said chamber.

* * * * *